Patented Mar. 13, 1923.

1,448,155

UNITED STATES PATENT OFFICE.

KARL SCHUTTE, OF RUTHERFORD, NEW JERSEY, ASSIGNOR TO THE FLINTKOTE COMPANY, OF BOSTON, MASSACHUSETTS, A CORPORATION OF MASSACHUSETTS.

WATERPROOFING ELEMENT.

No Drawing. Original application filed September 4, 1920, Serial No. 408,210. Divided and this application filed September 26, 1921. Serial No. 503,360.

*To all whom it may concern:*

Be it known that I, KARL SCHUTTE, a citizen of the United States, residing in the city of Rutherford, county of Bergen, and State of New Jersey, have invented certain new and useful Improvements in Waterproofing Elements, of which the following is a specification.

This invention relates to improvements in shingles and refers more particularly to an asphalt strip shingle or individual shingle made of saturated felt which is usually provided with an asphalt coating and a granular facing.

This application is a divisional application of an original application filed by me September 4th, 1920, Serial No. 408,210.

The object of the invention is to provide a shingle element of the type referred to which will have a waterproof seal back.

I have discovered from many tests that I have made that the ordinary asphalt shingles will absorb water and in particular that this absorption of water occurs through the uncoated backs and exposed edges of the felt shingle. This absorption of water is naturally objectionable as it has a tendency to introduce curling and induce expansion and contraction of the roofing element as its content of water or moisture varies.

I have found that by coating the backs of the shingles with a waterproof bituminous composition, I reduce to a minimum the amount of water absorption and more specfically I do this by coating the back of the shingle with an emulsified bituminous composition. This emulsified bituminous composition consists of a non-adhesive emulsified matrix of asphalt, water and colloidal clay such, for example, as may be prepared in accordance with the Patent No. 1,302,810, issued to Lester Kirschbraun. This emulsified matrix is made by first mixing an aqueous paste of water and colloidal clay and to this I gradually add the asphalt in melted or liquid form, in the meantime agitating the mixture so that it will produce an emulsion in which the water forms the continuous or external phase and the asphalt the dispersed or internal phase. This asphalt is preferably a fairly high melting point asphalt so as to prevent the shingles from sticking in the package. This asphalt may be air-blown asphalt of approximately 200 melting point and approximately 10 penetration. Instead of using air-blown asphalt, I may use a mixture of steam distilled asphalt and hard pitches as, for example, stearine pitches or other animal, vegetable or mineral pitches. It will be understood that the stiffness or consistency of this seal backing will be varied to suit the character of the shingle; for example, a higher melting point backing may be used where it is desirous of having a very stiff shingle and a comparative amount of colloidal clay can be incorporated into the backing when it is desired to obtain a combination of non-tackiness together with appreciable thickness. The shingle elements may be prepared in the following manner. I take ordinary dry roofing felt and run it through the asphalt saturating tank in the usual way. I then pass the saturated felt over a roller which is revolving in a pan or other receptacle containing the emulsified matrix referred to. The arrangement is such that a thin coating of the emulsion is applied to the under surface of the saturated felt. It is to be understood that this emulsion is cold and as this emulsified matrix is applied to the lower surface of the felt, the water is evaporated and the asphalt contained in the emulsion coalesces and forms a continuous waterproof film or coating over the bottom side of the saturated sheet. At the same time, the heat which is required for evaporating the water is extracted from the hot saturated felt. This not only results in the coalescing of the asphalt but produces another very advantageous result in that it materially reduces the temperature of the saturated felt itself. The saturated felt then may pass between the usual coating rollers and its upper surface coated with the usual asphalt coating and the granular facing is then applied to this asphalt coating. The sheet then passes over cooling drums and loopers and finally to the shingle chopping mechanism wherein either strip shingles or individual shingles may be formed. In this connection, it may be noted that the cooling of the saturated felt by application of the cold aqueous emulsion permits of very materially increasing the output of the machine. This results from the fact that in the present method of forming asphalt shingles the production is limited by the temperature at which the shingle can be received and stacked. If they are stacked while too hot, they stick together. Moreover, if they are too hot while passing over the loopers, the sheet is too weak, resulting in numerous breaks and shutting down of the entire machinery. From the foregoing, it will be seen that I not only get a novel and better product but that there is a pronounced advantage in the operation of the process itself from the standpoint of output.

It may be desirable in certain instances to sprinkle over this waterproof seal, powdered mica, talc or powdered slate to further decrease any tendency to sticking. It may also be noted that the waterproof seal referred to is preferably less than $\frac{1}{16}$ of an inch thick and is usually only a few thousandths of an inch thick, the object being to produce a waterproof seal and not to build up the roofing.

I claim as my invention:—

1. A shingle element consisting of asphalt saturated felt provided on one surface with an asphalt coating, a granular facing, and on its other with a waterproof seal comprising relatively thin coalesced bituminous film of asphalt and clay.

2. A shingle element consisting of asphalt saturated felt provided on one surface with an asphalt coating and on its other with a waterproof seal comprising relatively thin coalesced bituminous film of asphalt and clay.

3. A waterproofing element consisting of saturated felt provided on one side with a granular facing and on its other with a waterproof sealing compound, the major portion of which compound consists of bitumen of a different character than that with which the felt is itself saturated.

KARL SCHUTTE.